United States Patent [19]

Andermo et al.

[11] Patent Number: 6,005,387
[45] Date of Patent: Dec. 21, 1999

[54] REDUCED OFFSET HIGH ACCURACY INDUCED CURRENT POSITION TRANSDUCER

[75] Inventors: Nils Ingvar Andermo, Kirkland; Karl G. Masreliez, Bellevue, both of Wash.

[73] Assignee: Mitutoyo Corporation, Kawasaki, Japan

[21] Appl. No.: 08/834,432

[22] Filed: Apr. 16, 1997

[51] Int. Cl.[6] ............................... G01B 7/14; G01D 5/20; G08C 19/06; G08C 21/00

[52] U.S. Cl. ............................. 324/207.17; 324/207.12; 324/207.18; 324/207.24; 336/45; 336/129; 340/870.32

[58] Field of Search ........... 324/207.12, 207.17–207.19, 324/207.24, 207.25; 307/116–118; 318/653, 657, 661; 336/45, 75, 77, 79, 115, 129; 340/870.32, 870.34–870.36; 341/15

[56] References Cited

U.S. PATENT DOCUMENTS

| | | |
|---|---|---|
| 3,812,481 | 5/1974 | Stedtnitz . |
| 4,354,099 | 10/1982 | Rayment et al. . |
| 4,425,511 | 1/1984 | Brosh . |
| 4,503,922 | 3/1985 | Brosh et al. . |
| 4,638,250 | 1/1987 | Shen-Orr et al. . |
| 4,658,153 | 4/1987 | Brosh et al. . |
| 4,833,919 | 5/1989 | Saito et al. ..................... 324/207.24 X |
| 4,982,156 | 1/1991 | Lewis et al. ........................ 324/207.18 |
| 5,120,907 | 6/1992 | Shinbori et al. . |
| 5,175,541 | 12/1992 | Zieher ................................ 324/207.18 |
| 5,225,830 | 7/1993 | Andermo et al. . |
| 5,625,239 | 4/1997 | Persson et al. . |

FOREIGN PATENT DOCUMENTS

| | | |
|---|---|---|
| 0443148 | 8/1991 | European Pat. Off. . |
| 0501453 | 9/1992 | European Pat. Off. . |
| 0709648 | 5/1996 | European Pat. Off. . |
| 4009977 | 3/1991 | Germany . |
| WO 95/31696 | 11/1995 | WIPO . |
| WO 97/19323 | 5/1997 | WIPO . |

*Primary Examiner*—Gerard Strecker
*Attorney, Agent, or Firm*—Oliff & Berridge, PLC

[57] ABSTRACT

A reduced offset position transducer uses at least one coupling loop on a scale to inductively couple a transmitter winding on a read head to one or more receiver windings on the read head. The transmitter winding generates at least one primary magnetic field. The transmitter winding is inductively coupled to first loop portions of the coupling loops by the primary magnetic field. Second loop portions of the coupling loops generate secondary magnetic fields. Each receiver winding is inductively coupled to the second loop portions of the coupling loops by the secondary magnetic fields. At least one of the transmitter winding or the receiver windings is formed in a periodic pattern complementary to the dimensions of the coupling loops. Prescribed winding configurations are used to reduce the effects of extraneous inductive coupling in the device. Depending on the relative position between the read head and the scale, the receiver windings inductively couple to the second loop portions of the coupling loops to various degrees. A compact, high accuracy, high resolution inductive position sensor results. Low power operation is possible.

40 Claims, 10 Drawing Sheets

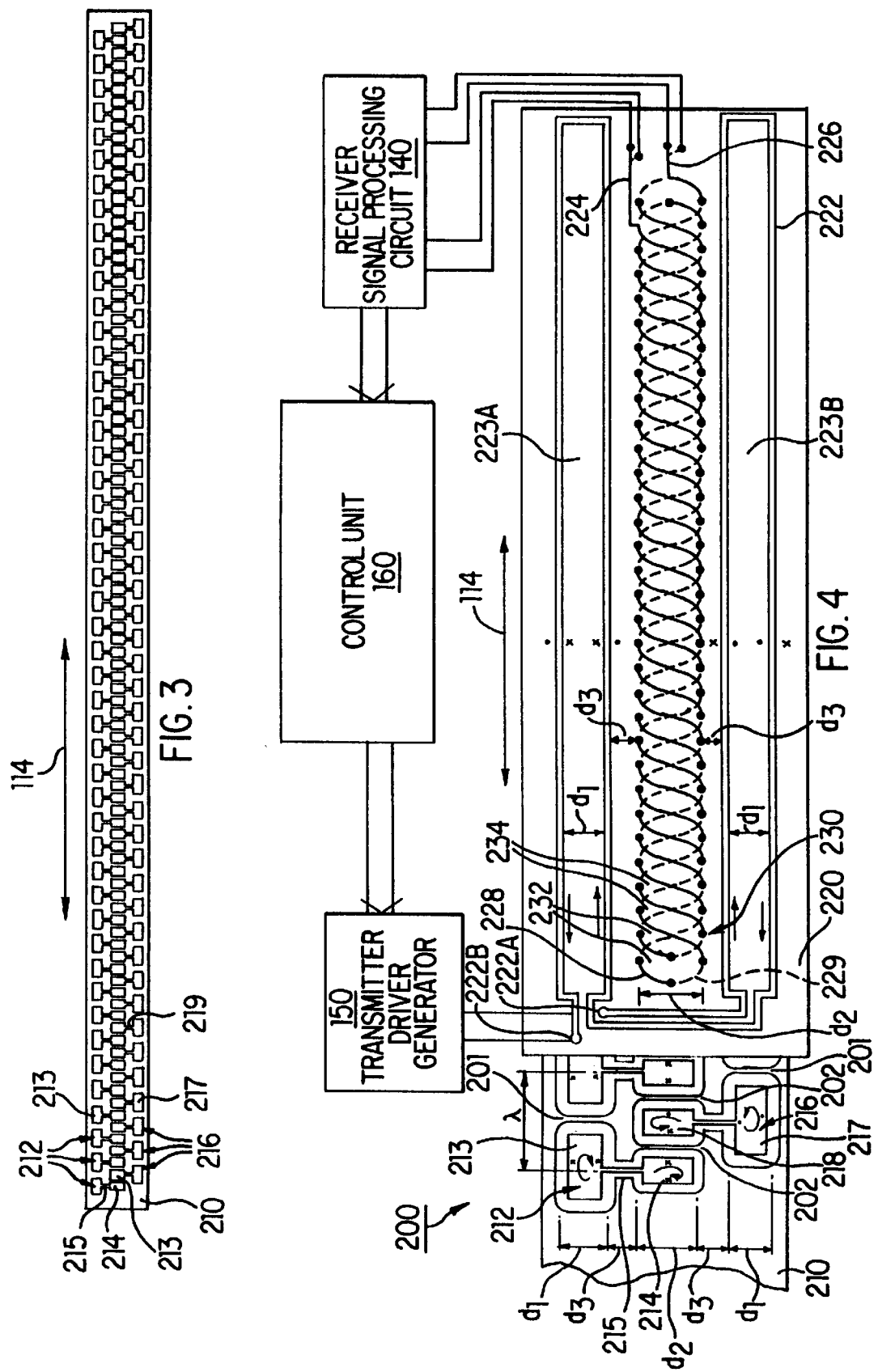

REDUCED OFFSET HIGH ACCURACY INDUCED CURRENT POSITION TRANSDUCER

BACKGROUND OF THE INVENTION

1. Field of Invention

This invention relates to induced current linear and rotary position transducers. In particular, this invention is directed to rotary and linear induced current position transducers with improved winding configurations to increase the proportion of the useful output signal component, i.e. those related to transducer position, relative to extraneous ("offset") components of the output signal which are unrelated to transducer position.

2. Description of Related Art

U.S. patent application Ser. No. 08/441,769, filed May 16, 1995, and incorporated herein in its entirety, discloses an incremental induced current position transducer. U.S. patent application Ser. No. 08/645,483, filed May 13, 1996, and incorporated herein in its entirety, discloses an electronic caliper using an induced current position transducer. Both applications disclose associated signal processing techniques for induced current position transducers.

The operation of the induced current position transducers of these applications is generally shown in FIGS. 1 and 2. As shown in FIG. 1, the induced current position transducer 100 comprises a read head 120 that is movable relative to a scale 110. The scale 110 and the read head 120 are preferably formed on printed circuit boards using standard printed circuit board technology.

A plurality of magnetic flux modulators 112 are distributed along a measuring axis 114 of the induced current position transducer 100 at a pitch equal to a wavelength $\lambda$, which is described in more detail below. The flux modulators 112 have a nominal width along the measuring axis 114 of $\lambda/2$. The flux modulators 112 have a width d in a direction perpendicular to the measuring axis 114.

The read head 120 includes a generally rectangular transmitter winding 122 that is connected to a drive signal generator 150. The drive signal generator 150 provides a time-varying drive signal to the transmitter winding 122. The time-varying drive signal is preferably a high frequency sinusoidal signal, a pulse signal, or an exponentially decaying sinusoidal signal. When the time-varying drive signal is applied to the transmitter winding 122, the time-varying current flowing in the transmitter winding 122 generates a corresponding time-varying, or changing, magnetic field. Because the transmitter winding 122 is generally rectangularly shaped, the generated magnetic field is substantially constant within a flux region in the central portion of the transmitter winding 122.

The read head 120 further includes a first receiver winding 124 and a second receiver winding 126 positioned on the read head within the flux region inside the transmitter winding 122. Each of the first receiver winding 124 and the second receiver winding 126 is formed by a plurality of first loop segments 128 and second loop segments 129. The first loop segments 128 are formed on a first surface of a layer of the printed circuit board. The second loop segments 129 are formed on another surface of the layer of the printed circuit board. The layer of the printed circuit board acts as an electrical insulation layer between the first loop segments 128 and the second loop segments 129. Each end of each of the first loop segments 128 is connected to one end of one of the second loop segments 129 through feed-throughs 130 formed in the layer of the printed circuit board.

The first and second loop segments 128 and 129 are preferably sinusoidally shaped. Accordingly, as shown in FIG. 1, the first and second loop segments 128 and 129 forming each of the receiver windings 124 and 126 form a sinusoidally-shaped periodic pattern having the wavelength $\lambda$. Each of the receiver windings 124 and 126 are thus formed having a plurality of loops 132 and 134.

The loops 132 and 134 in each of the first and second receiver windings 124 and 126 have a width along the measuring axis 114 equal to $\lambda/2$. Thus, each pair of adjacent loops 132 and 134 has a width equal to $\lambda$. Furthermore, the first and second loop segments 128 and 129 go through a full sinusoidal cycle in each pair of adjacent loops 132 and 134. Thus, $\lambda$ corresponds to the sinusoidal wavelength of the first and second receiver windings 124 and 126. Furthermore, the receiver winding 126 is offset by $\lambda/4$ from the first receiver winding 124 along the measuring axis 114. That is, the first and second receiver windings 124 and 126 are in quadrature.

The changing drive signal from the drive signal generator 150 is applied to the transmitter winding 122 such that current flows in the transmitter winding 122 from a first terminal 122a, through the transmitter winding 122 and out through a second terminal 122b. Thus, the magnetic field generated by the transmitter winding 122 descends into the plane of FIG. 1 within the transmitter winding 122 and rises up out of the plane of FIG. 1 outside the transmitter winding 122. Accordingly, the changing magnetic field within the transmitter winding 122 generates an induced electromagnetic force (EMF) in each of the loops 132 and 134 formed in the receiver windings 124 and 126.

The loops 132 and 134 have opposite winding directions. Thus, the EMF induced in the loops 132 has a polarity that is opposite to the polarity of the EMF induced in the loops 134. The loops 132 and 134 enclose the same size areas and thus nominally the same amount of magnetic flux. Therefore, the absolute magnitude of the EMF generated in each of the loops 132 and 134 is nominally the same.

There are preferably equal numbers of loops 132 and 134 in each of the first and second receiver windings 124 and 126. Ideally, the positive polarity EMF induced in the loops 132 is exactly offset by the negative polarity EMF induced in the loops 134. Accordingly, the net nominal EMF on each of the first and second receiver windings 124 and 126 is zero and it is intended that no signal is output from the first and second receiver windings 124 and 126 as a result solely of the direct coupling from the transmitter winding 122 to the receiver windings 124 and 26.

When the read head 120 is placed in proximity to the scale 110, the changing magnetic flux generated by the transmitter winding 122 also passes through the flux modulators 112. The flux modulators 112 modulate the changing magnetic flux and can be either flux enhancers or flux disrupters.

When the flux modulators 112 are provided as flux disrupters, the flux modulators 112 are formed as conductive plates or thin conductive films on the scale 110. As the changing magnetic flux passes through the conductive plates or thin films, eddy currents are generated in the conductive plates or thin films. These eddy currents in turn generate magnetic fields having a field direction that is opposite to that of the magnetic field generated by the transmitter winding 122. Thus, in areas proximate to each of the flux disrupter-type flux modulators 112, the net magnetic flux is less than the net magnetic flux in areas distant from the flux disrupter-type flux modulators 122.

When the scale 110 is positioned relative to the read head 120 such that the flux disrupters 112 are aligned with the positive polarity loops 132 of the receiver winding 124, the net EMF generated in the positive polarity loops 132 is reduced compared to the net EMF generated in the negative polarity loops 134. Thus, the receiver winding 124 becomes unbalanced and has a net negative signal across its output terminals 124a and 124b.

Similarly, when the flux disrupters 112 are aligned with the negative polarity loops 134, the net magnetic flux through the negative polarity loops 134 is disrupted or reduced. Thus, the net EMF generated in the negative polarity loops 134 is reduced relative to the net EMF generated in the positive polarity loops 132. Thus, the first receiver winding 124 has a net positive signal across its output terminals 124a and 124b.

When the flux modulators 112 are provided as flux enhancers, this result is exactly reversed. The flux-enhancer-type flux modulators 112 are formed by portions of high magnetic permeability material provided in or on the scale 110. The magnetic flux generated by the transmitter winding 122 preferentially passes through the high magnetic permeability flux-enhancer-type flux modulators 112. That is, the density of the magnetic flux within the flux enhancers 112 is enhanced, while the flux density in areas outside the flux enhancers 112 is reduced.

Thus, when the flux enhancers 112 are aligned with the positive polarity loops 132 of the second receiver winding 126, the flux density through the positive polarity loops 132 is greater than the flux density passing through the negative polarity loops 134. Thus, the net EMF generated in the positive polarity loops 132 increases, while the net EMF induced in the negative polarity loops 134 decreases. This appears as a positive signal across the terminals 126a and 126b of the second receiver winding 126.

When the flux enhancers are aligned with the negative polarity loops 134, the negative polarity loops 134 generate an enhanced EMF relative to the EMF induced in the positive polarity loops 132. Thus, a negative signal appears across the terminals 126a and 126b of the second receiver winding 126. It should also be appreciated that, as outlined in the incorporated references, both the flux enhancing and flux disrupting effects can be combined in a single scale, where the flux enhancers and the flux disrupters are interleaved along the length of the scale 110. This would act to enhance the modulation of the induced EMF, because the effects of both types of flux modulator additively combine.

As indicated above, the width and height of the flux modulators 112 are nominally λ/2 and d, respectively, while the pitch of the flux modulators 122 is nominally λ. Similarly, the wavelength of the periodic pattern formed in the first and second receiver windings 122 and 124 is nominally λ and the height of the loops 132 and 134 is nominally d. Furthermore, each of the loops 132 and 134 encloses a nominally constant area.

FIG. 2A shows the position-dependent output from the positive polarity loops 132 as the flux modulators 112 move relative to the positive polarity loops 132. Assuming the flux modulators 112 are flux disrupters, the minimum signal amplitude corresponds to those positions where the flux disrupters 112 exactly align with the positive polarity loops 132, while the maximum amplitude positions correspond to the flux disrupters 112 being aligned with the negative polarity loops 134.

FIG. 2B shows the signal output from each of the negative polarity loops 134. As with the signal shown in FIG. 2A, the minimum signal amplitude corresponds to those positions where the flux disrupters 112 exactly align with the positive polarity loops 132, while the maximum signal output corresponds to those positions where the flux disrupters exactly align with the negative polarity loops 134. It should be appreciated that if flux enhancers were used in place of flux disrupters, the minimum signal amplitudes in FIGS. 2A and 2B would correspond to the flux enhancers 112 aligning with the negative polarity loops 134, while the maximum signal amplitude would correspond to the flux enhancers 112 aligning with the positive polarity loops 132.

FIG. 2C shows the net signal output from either of the first and second receiver windings 124 and 126. This net signal is equal to the sum of the signals output from the positive and negative polarity loops 132 and 134, i.e., the sum of the signals shown in FIGS. 2A and 2B. The net signal shown in FIG. 2C should ideally be symmetrical around zero, that is, the positive and negative polarity loops 132 and 134 should be exactly balanced to produce a symmetrical output with zero offset.

However, a "DC" (position independent) component often appears in the net signal in a real device. This DC component is the offset signal $V_o$. This offset $V_o$ is an extraneous signal component which complicates signal processing and leads to undesirable position measurement errors. This offset has two major sources.

First, the full amplitude of the transmitter field passes through the first and second receiver windings 124 and 126. As outlined above, this induces a voltage in each loop 132 and 134. The induced voltage is nominally canceled because the loops 132 and 134 have opposite winding directions. However, to perfectly cancel the induced voltage in the receiver windings requires the positive and negative loops 132 and 134 to be perfectly positioned and shaped, for a perfectly balanced result. The tolerances on the balance are critical because the voltages induced directly into the receiver winding loops 132 and 134 by the transmitter winding 122 are much stronger than the modulation in the induced voltage caused by the flux modulators 112. In practice, fabrication tolerances always prevent perfect balance.

Second, the spatially modulated field created by the flux modulators 112 also exhibits an average position-independent offset component. That is, the flux modulators 112 within the magnetic field generated by the transmitter winding 122 all create the same polarity spatial modulation in the magnetic field. For example, when flux disrupters are used, the induced eddy current field from the flux modulators has an offset because the flux disrupters within the transmitter field all create a same polarity secondary magnetic field. At the same time, the space between the flux disrupters does not create a secondary magnitude field.

Thus, each positive polarity loop 132 and each negative polarity loop 134 of the receiver windings 124 and 126 sees a net magnetic field that varies between a minimum value and a maximum value having the same polarity. The mean value of this function is not balanced around zero, i.e., it has a large nominal offset. Similarly, when flux enhancers are used, the field modulation due to the flux enhancers has a bias because the enhancers within the transmitter winding 122 all create the same field modulation, while the space between the modulators provides no modulation. Each positive and negative polarity loop 132 or 134 of each receiver winding 124 or 126 therefore sees a spatially modulated field that varies between a minimum value and a maximum value having the same polarity. The mean value of this function also has a large nominal offset.

A receiver winding having an equal number of similar positive and negative polarity loops 132 and 134 helps eliminate the offset components. However, any imperfection in the balance between the positive and negative polarity loops 132 and 134 allows residual offsets according to the previous description.

Both of these offset components are expected to be canceled solely by the symmetry between the positive and negative polarity loops 132 and 134 in the first and second receiver windings 124 and 126. This puts very stringent requirements on the manufacturing precision of the receiver windings 124 and 126. Experience in manufacturing the transducer 100 indicates it is practically impossible to eliminate this source of error from the induced current position transducer 100.

Any signal component which is independent of the transducer position, such as the aforementioned offset components, is regarded as an extraneous signal to the operation of the transducer. Such extraneous signals complicate the required signal processing circuitry and otherwise lead to errors which compromise the accuracy of the transducer.

Other related art has disclosed simple winding configurations with the extraneous coupling between the transmitter and receiver windings reduced simply by placing the receiver winding distant from the field produced by the transmitter winding. However, the effectiveness of this technique alone depends on the degree of separation between the transmitter and receiver windings, and hence this technique contradicts the need for high accuracy position sensors of compact size. Alternatively, the transmitter field can be confined with magnetically permeability materials so that the effectiveness of a given degree of separation is increased. However, this technique leads to additional complexity, cost, and sensitivity to external fields, in a practical device.

Furthermore, the simple winding configurations disclosed in association with these techniques include no means for creating a device with a measuring range significantly exceeding the span of the transmitter and receiver winding. In addition, the simple winding configurations provide no means for significantly enhancing the degree of output signal change per unit of displacement for a given measuring range. Thus, the practical measuring resolution of these devices is limited for a given measuring range.

The need for a high accuracy inductive measuring device which rejects both extraneous signal components and external fields, is compact, of simple construction, and capable of high resolution measurement over an extended measuring range without requiring increased fabrication and circuit accuracies, has therefore not been met previously.

SUMMARY OF THE INVENTION

This invention provides an induced current position transducer with improved winding configurations. The improved winding configurations increase the proportion of the useful output signal component relative to extraneous ("offset") components of the output signal, without requiring increased transducer fabrication accuracy. Furthermore, the winding configurations provide means to enhance the degree of output signal change per unit of displacement, for a given measuring range.

This is accomplished by winding configurations that minimize and nullify the extraneous coupling between the transmitter and receiver windings while providing enhanced position-dependent coupling between them through a plurality of coupling windings on the scale which interact with a plurality of spatial modulations of the windings.

This invention further provides a "reduced offset" incremental induced current position transducer having a scale and a read head that are movable relative to each other along a measuring axis. The read head includes a pair of receiver windings extending along the measuring axis. The read head further includes a transmitter winding extending along the measuring axis and positioned external to the receiver windings in a direction perpendicular to the measuring axis.

In a first preferred embodiment of the induced current position transducer of this invention, the transmitter winding is divided into a first transmitter loop and a second transmitter loop, with the first transmitter loop placed on one side of the receiver windings and the second transmitter loop placed on the other side of the receiver windings. The magnetic fields created by the first and second loops of the transmitter winding counteract each other in the area of the receiver winding. This minimizes the extraneous effects of any direct coupling from the transmitter winding to the receiver winding.

The scale member has a plurality of first coupling loops extending along the measuring axis and interleaved with a plurality of second coupling loops also extending along the measuring axis. The first coupling loops have a first portion aligned with the first transmitter winding loop and a second portion aligned with the receiver windings. Similarly, the second coupling loops have a first portion aligned with the second winding loop and a second portion aligned with the receiver windings. In a second embodiment of the induced current position transducer of this invention, the transmitter has only one loop, which is placed alongside the receiver windings on the read-head. The scale member in this case has a plurality of first coupling loops arrayed along the measuring axis and interleaved with a second plurality of coupling loops also arrayed along the measuring axis. Both the first and second coupling loops have a first portion aligned with the transmitter winding and a second portion aligned with the receiver windings.

The first and second portions of each first coupling loop are connected in series and are "untwisted". Thus, the magnetic fields induced in the first and second portions of the first coupling loops have the same polarity. In contrast, the first and second portion of each second coupling loop are connected in series and are "twisted". In this case, the magnetic fields induced in the first and second portions of the second coupling loops have opposite polarities. This creates an alternating induced magnetic field along the measuring axis in the area under the receiver winding in response to exciting the transmitter winding.

These winding configurations substantially eliminate several extraneous signal components, resulting in simplified signal processing and improved transducer accuracy and robustness, in an economical design.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 3 shows a first preferred embodiment of the scale for the reduced offset induced current position transducer of this invention;

FIG. 4 shows a first preferred embodiment of the reduced offset induced current position transducer of this invention;

DETAILED DESCRIPTION OF THE PREFERRED EMBODIMENTS

Figure 1:
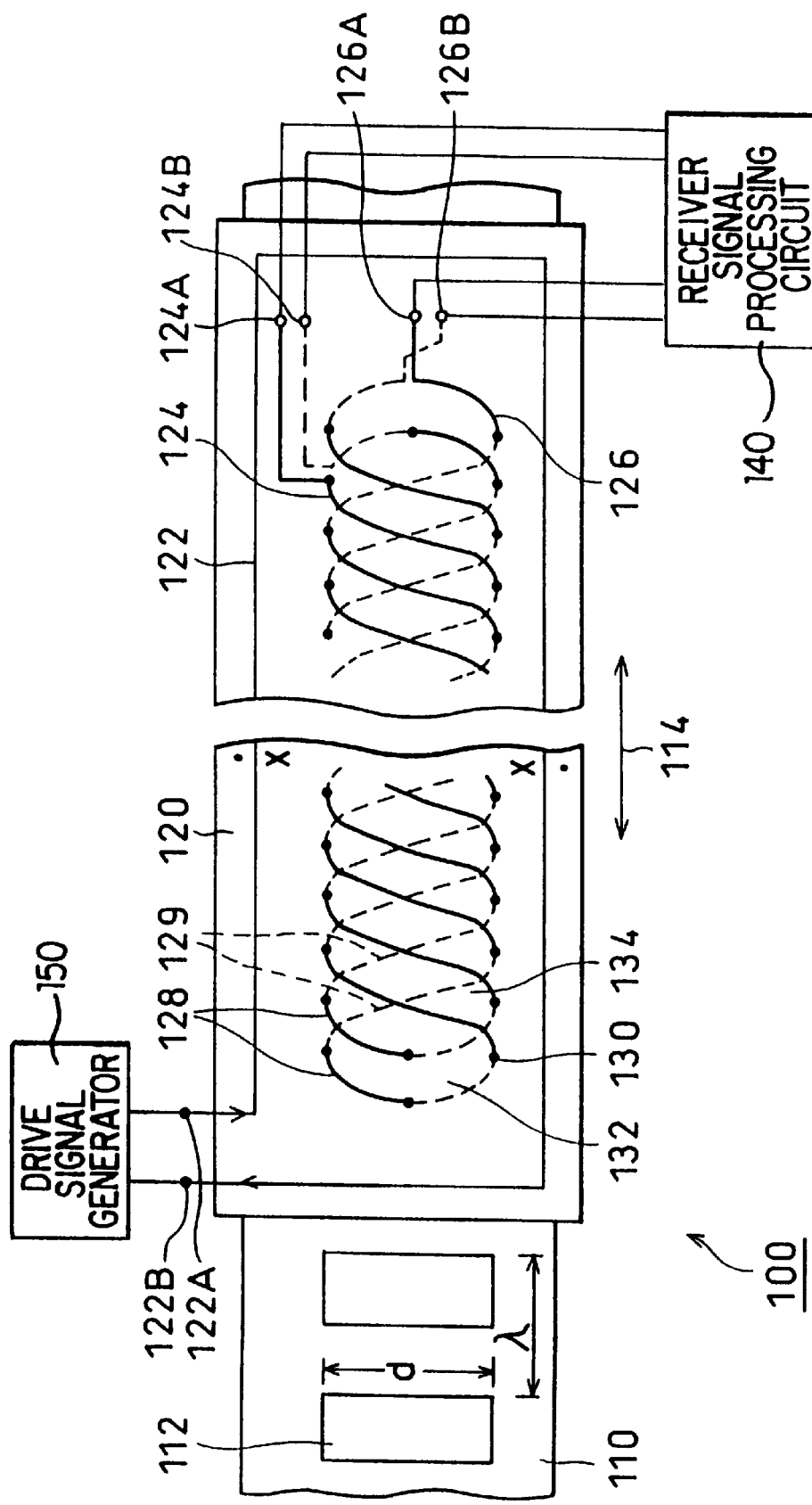
FIG. 1 shows a known induced current position transducer having a undesirable extraneous signal offset components.

FIGS. 3 and 4 show a first preferred embodiment of a reduced-offset induced current position transducer 200, which produces an output type usually referred to as "incremental". "Incremental" means the transducer produces a cyclic output which is repeated according to a design-related increment of transducer displacement. In particular, FIG. 3 shows a first preferred embodiment of the reduced-offset scale 210 of the transducer 200. As shown in FIG. 3, the reduced-offset scale 210 includes a first plurality of closed-loop coupling loops 212 interleaved with a second plurality of closed-loop coupling loops 216. Each of the coupling loops 212 and 216 is electrically isolated from the others of the first and second plurality of coupling loops 212 and 216.

Each of the first plurality of coupling loops 212 includes a first loop portion 213 and a second loop portion 214 connected by a pair of connecting conductors 215. Similarly, each of the second plurality of coupling loops 216 includes a first loop portion 217 and a second loop portion 218 connected by a pair of connecting conductors 219.

In the first plurality of coupling loops 212, the first loop portions 213 are arranged along one lateral edge of the scale 210 and are arrayed along the measuring axis 114. The second loop portions 214 are arranged along the center of the scale 210 and are arrayed along the measuring axis. The connecting conductors 215 extend perpendicularly to the measuring axis 114 to connect the first loop portions 213 to the second loop portions 214.

Similarly, in the second plurality of coupling loops 216, the first loop portions 217 are arranged along a second lateral edge of the scale 210 and arrayed along the measuring axis 114. The second loop portions 218 are arranged along the center of the scale 210 along the measuring axis, interleaved with the second loop portions 214 of coupling loops 212. The connecting conductors 219 extend generally perpendicularly to the measuring axis 114 to connect the first loop portions 217 to the second loop portions 218.

As shown in FIG. 4, the read head 220 of the transducer 200 includes a transmitter winding 222 having a first transmitter winding portion 223A and a second transmitter winding portion 223B. As shown in FIG. 4, the first transmitter winding portion 223A is provided at a first lateral edge of the read head 220, while the second transmitter winding portion 223B is provided at the other lateral edge of the read head 220. Each of the first and second transmitter winding portions 223A and 223B have the same long dimension extending along the measuring axis 114. Furthermore, each of the first and second transmitter winding portions 223A and 223B have a short dimension that extends in a direction perpendicular to the measuring axis 114 a distance $d_1$.

The terminals 222A and 222B of the transmitter winding 222 are connected to the transmitter drive signal generator 150. The transmitter drive signal generator 150 outputs a time-varying drive signal to the transmitter winding terminal 222A. Thus, a time-varying current flows through the transmitter winding 222 from the transmitter winding terminal 222A to the transmitter terminal 222B, as indicated in FIG. 4.

In response, the first transmitter winding portion 223A generates a primary magnetic field that rises up out of the plane of FIG. 4 inside the first transmitter winding portion 223A and descends into the plane of FIG. 4 outside the loop formed by the first transmitter winding portion 223A. In contrast, the second transmitter winding portion 223B generates a primary magnetic field that rises out of the plane of FIG. 4 outside the loop formed by the second transmitter winding portion 223B and descends into the plane of FIG. 4 inside the loop formed by the second transmitter winding portion 223B. In response, a current is induced in the coupling loops 212 and 216 that counteracts the change of magnetic field.

Thus, the induced current in each of the coupling loop sections 213 and 217 flows in a direction opposite to the current flowing in the respective adjacent portions of the transmitter loops 223A and 223B. As shown in FIG. 4, adjacent ones of the second loop portions 214 and 218 in the center section of the scale have loop currents having opposite polarities. Thus, a secondary magnetic field is created having field portions of opposite polarity periodically distributed along the center section of the scale. The wavelength $\lambda$ of the periodic secondary magnetic field is equal to the distance between successive second loop portions 214 (or 218).

The read head 220 also includes first and second receiver windings 224 and 226 that are generally identical to the first and second receiver windings 124 and 126 shown in FIG. 1. In particular, similarly to the first and second receiver windings 124 and 126 shown in FIG. 1, the first and second receiver windings 224 and 226 are each formed by a plurality of sinusoidally shaped loop segments 228 and 229 formed on opposite sides of an insulating layer of the printed circuit board forming the read head 220.

The loop segments 228 and 229 are linked through feed-throughs 230 to form alternating positive polarity loops 232 and negative polarity loops 234 in each of the first and second receiver windings 222 and 226. The receiver windings 224 and 226 are positioned in the center of the read head 220 between the first and second transmitter portions 223A and 223B. Each of the first and second receiver windings 224 and 226 extends in the direction perpendicular to the measuring axis a distance $d_2$.

Extraneous (position independent and scale independent) coupling from the transmitter loops to the receiver loops is generally avoided in this configuration. That is, the primary magnetic fields generated by the first and second transmitter portions 223A and 223B point in opposite directions in the vicinity of the first and second receiver windings 224 and 226. Thus, the primary magnetic fields counteract each other in the area occupied by the first and second receiver windings 224 and 226. Ideally, the primary magnetic fields completely counteract each other in this area.

The first and second receiver windings 224 and 226 are spaced equal distances $d_3$ from the inner portions of the first and second transmitter winding portions 223A and 223B. Thus, the magnetic fields generated by each of the first and second transmitter winding portions 223A and 223B in the portion of the read head 220 occupied by the first and second receiver windings 224 and 226 are in symmetric opposition. The associated inductive effects thus effectively cancel each other out. Thus, the net voltage induced in the first and second receiver windings 224 and 226 by extraneous direct coupling to the first and second transmitter winding portions 223A and 223B is reduced to a first extent by positioning the transmitter windings away from the receiver windings. Secondly, the symmetric design effectively reduces the net extraneous coupling to zero.

Each of the first plurality of coupling loops 212 is arranged at a pitch equal to a wavelength $\lambda$ of the first and second receiver windings 224 and 226. Furthermore, the first loop portions 213 each extends a distance along the measuring axis 114 which is as close as possible to the wavelength $\lambda$ while still providing the insulating space 201 between adjacent ones of the first loop portions 213. In addition, the first loop portions 213 extend the distance $d_1$ in the direction perpendicular to the measuring axis 114.

Similarly, each of the second plurality of coupling loops 216 is also arranged at a pitch equal to the wavelength $\lambda$. The first loop portions 217 also extend as close as possible to each other along the measuring axis to the wavelength $\lambda$ while providing the space 201 between adjacent ones of the first loop portions 217. The first loop portions 217 also extend the distance $d_1$ in the direction perpendicular to the measuring axis 114.

The second loop portions 214 and 218 of the first and second pluralities of coupling loops 212 and 216 are also arranged at a pitch equal to the wavelength $\lambda$. However, each of the second loop portions 214 and 218 extends along the measuring axis as close as possible to only one-half the wavelength $\lambda$. An insulating space 202 is provided between each adjacent pair of second loop portions 214 and 218 of the first and second pluralities of coupling loops 212 and 216, as shown in FIG. 4. Thus, the second loop portions 214 and 218 of the first and second pluralities of coupling loops 212 and 216 are interleaved along the length of the scale 210. Finally, each of the second loop portions 214 and 218 extends the distance $d_2$ in the direction perpendicular to the measuring axis 114.

As shown in FIG. 4, the second loop portions 214 and 218 are spaced the distance $d_3$ from the corresponding first loop portions 213 and 217. Accordingly, when the read head 220 is placed in proximity to the scale 210, as shown in FIG. 4, the first transmitter winding portion 223A aligns with the first loop portions 213 of the first plurality of coupling loops 212. Similarly, the second transmitter winding portion 223B aligns with the first loop portions 217 of the second plurality of coupling loops 216. Finally, the first and second receiver windings 224 and 226 align with the second loop portions 214 and 218 of the first and second coupling loops 212 and 216.

In operation, a time-varying drive signal is output by the transmitter drive signal generator 150 to the transmitter winding terminal 222A. Thus, the first transmitter winding portion 223A generates a first changing magnetic field having a first direction while the second transmitter winding portion 223B generates a second magnetic field in a second direction that is opposite to the first direction. This second magnetic field has a field strength that is equal to a field strength of the first magnetic field generated by the first transmitter winding portion 223A.

Each of the first plurality of coupling loops 212 is inductively coupled to the first transmitter winding portion 223A by the first magnetic field generated by the first transmitter winding portion 223A. Thus, an induced current flows clockwise through each of the first plurality of coupling loops 212. At the same time, the second plurality of coupling loops 216 is inductively coupled to the second transmitter winding portion 223B by the second magnetic field generated by the second transmitter winding portion 223B. This induces a counterclockwise current to flow in each of the second plurality of coupling loops 216. That is, the currents through the second portions 214 and 218 of the coupling loops 212 and 216 flow in opposite directions.

The clockwise flowing current in each of the second portions 214 of the first coupling loops 212 generates a third magnetic field that descends into the plane of FIG. 4 within the second portions 214. In contrast, the counterclockwise flowing currents in the second loop portions 218 of the second coupling loops 216 generate a fourth magnetic field that rises out of the plane of FIG. 4 within the second loop portions 218 of the second coupling loops 216. Thus, a net alternating magnetic field is formed along the measuring axis 214. This net alternating magnetic field has a wavelength which is equal to the wavelength $\lambda$ of the first and second receiver windings 224 and 226.

Accordingly, when the positive polarity loops 232 of the first receiver winding 224 are aligned with either the second loop portions 214 or 218, the negative polarity loops 234 of the first receiver winding 224 are aligned with the other of the second loop portions 214 or 218. This is also true when the positive polarity loops 232 and the negative polarity loops 234 of the second receiver winding 226 are aligned with the second loop portions 214 and 218. Because the alternating magnetic field generated by the second loop portions 214 and 218 is spatially modulated at the same wavelength as the spatial modulation of the first and second receiver windings 214 and 216, the EMF generated in each of the positive and negative polarity loops 232 and 234 when aligned with the second loop portions 214 is equal and opposite to the EMF generated when they are aligned with the second loop portions 218.

Figure 2A:
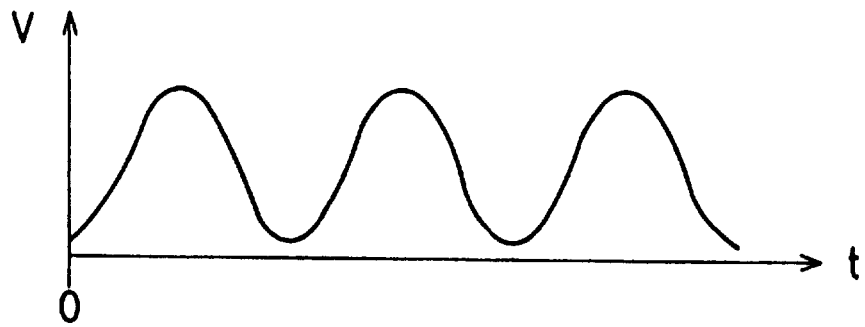
FIG. 2A shows the position-dependent output of the positive polarity loops of FIG. 1.
Figure 2B:
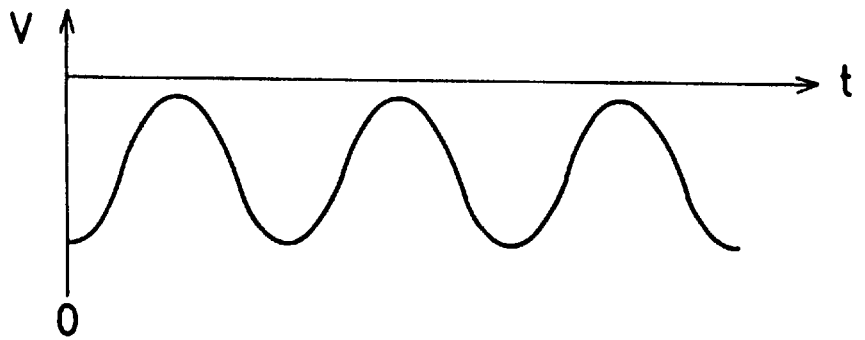
FIG. 2B shows the position-dependent output of the negative polarity loops of FIG. 1.
Figure 2C:
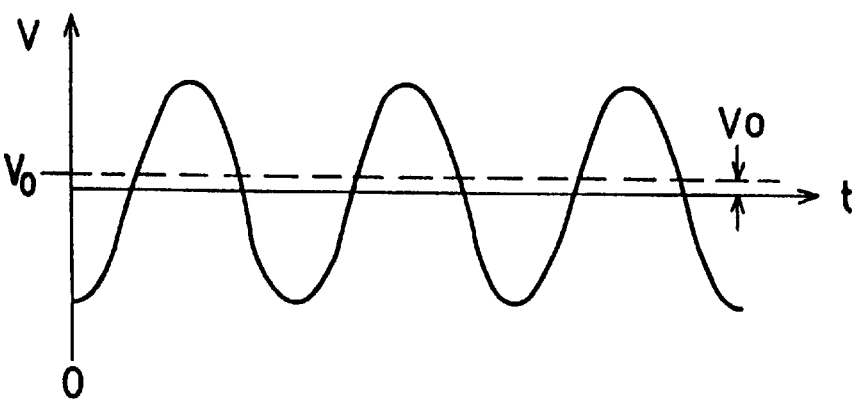
FIG. 2C shows the net position-dependent output of the positive and negative polarity loops of FIG. 1.

Thus, the net output of the positive polarity loops 232, as the read head 220 moves relative to the scale 210 is a sinusoidal function of the position "x" of the read-head along the scale and the offset component of the output signal due to extraneous coupling is nominally zero. Similarly, the net output from the negative polarity loops 234, as the read head 220 moves relative to the scale 210, is also a sinusoidal function of the position "x" of the read head along the scale and the offset component of the output signal due to extraneous coupling is nominally zero. The EMF contributions from the positive polarity loops 232 and the negative polarity loops 234 are in phase. They thus generate a net position-dependent output signal corresponding to FIG. 2C, but the DC bias $V_o$ due to extraneous coupling is reduced to insignificance in this preferred embodiment.

Finally, the first and second receiver windings 224 and 226, like the first and second receiver windings 124 and 126, are in quadrature. Thus, the output signal generated by the first receiver winding 224 as a function of x and output to the receiver signal processing circuit 140 is 90° out of phase with the signal output by the second receiver winding 226 as a function of x to the receiver signal processing circuit 140.

The receiver signal processing circuit 140 inputs and samples the output signals from the first and second receiver windings 224 and 226, converts these signals to digital values and outputs them to the control unit 160. The control unit 160 processes these digitized output signals to determine the relative position x between the read head 220 and the scale 210 within a wavelength $\lambda$.

It should be appreciated that, with a suitable feed-through arrangement, either the positive polarity loops 232 or the negative polarity loops 234 could be reduced to zero width perpendicular to the measuring axis (becoming effectively simple conducting elements between the adjacent loops). In this case, the first and second receiver windings 224 and 226 become unipolar flux receivers, introducing an increased sensitivity to external fields, and reducing their output signal amplitude to half that of the previously described embodiment (due to the eliminated loop area).

However, the modified design retains many inventive benefits. The net extraneous flux through the loops is still nominally zero due to the symmetric transmitter winding configuration. The output signal from each receiver winding 224 and 226 still swings from a maximum positive value to a maximum negative value with nominally zero offset. The degree of output signal change per unit of displacement, for a given measuring range, is still very high, due to the complementary periodic structure of the scale elements and receiver windings.

Based on the nature of the quadrature output from the first and second receiver windings 224 and 226, the control unit 160 is able to determine the direction of relative motion between the read head 220 and the scale 210. The control unit 160 counts the number of partial or full "incremental" wavelengths $\lambda$ traversed, by signal processing methods well-known to those skilled in the art and disclosed herein and in the incorporated references. The control unit 160 uses that number and the relative position within a wavelength $\lambda$ to output the relative position between the read head 220 and the scale 210 from a set origin.

The control unit 160 also outputs control signals to the transmitter drive signal generator 150 to generate the time-varying transmitter drive signal. It should be appreciated that any of the signal generating and processing circuits shown in the incorporated references can be used to implement the receiver signal processing circuit 140, the transmitter drive signal generator 150 and the control unit 160. Thus, these circuits will not be described in further detail herein.

Figure 5:
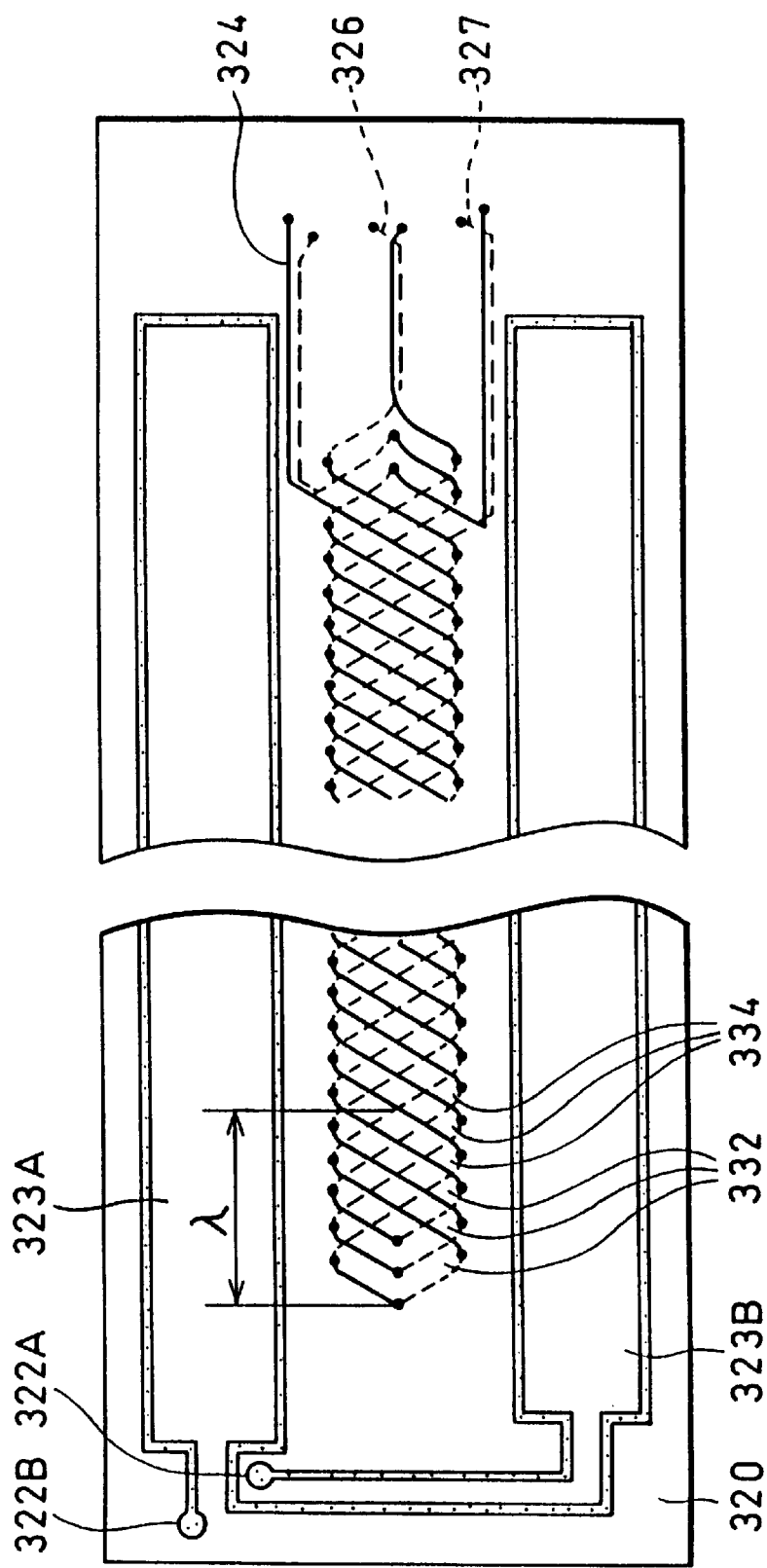
FIG. 5 shows a second preferred embodiment of the read-head for the reduced offset induced current position transducer of this invention.
Figure 6:
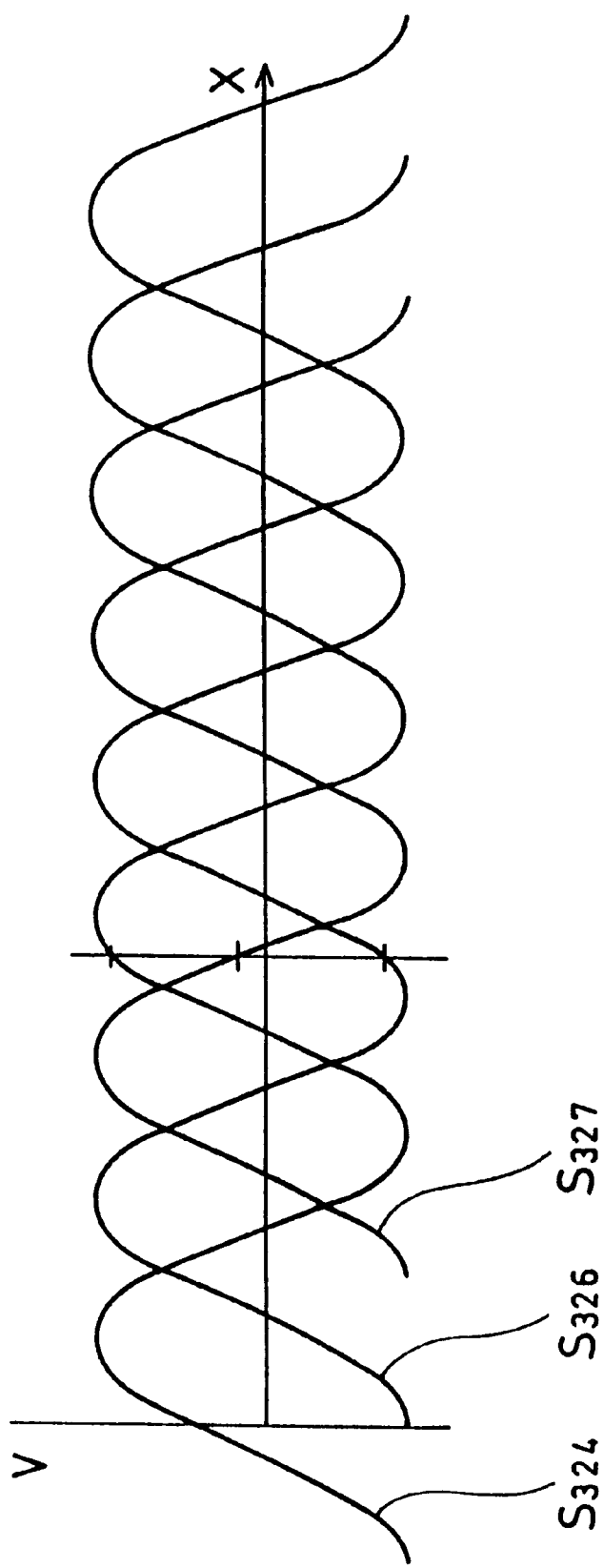
FIG. 6 shows the signal amplitudes as a function of the relative position of the scale and read-head of FIG. 5.

FIG. 5 show a second preferred embodiment of a read-head that can be used with a scale according to FIG. 3. The receiver in this version of the read-head has three receiver windings 324, 326 and 327. The receiver windings are offset from each other along the measurement axis by ⅓ of the wavelength $\lambda$. FIG. 6 shows the signal functions from the three receivers as a function of the position x along the measurement axis.

It should be appreciated that perfectly sinusoidal output functions are difficult to achieve in practice, and that deviations from a perfect sinusoidal output contain spatial harmonics of the fundamental wavelength of the transducer. Therefore, the three phase configuration of this second preferred embodiment of the reduced-offset induced current position transducer has a significant advantage over the first preferred embodiment of the reduced offset induced current position transducer, in that the third harmonic content in the separate receiver windings' signal function of x can be largely eliminated as a source of position measurement error.

Figure 7:
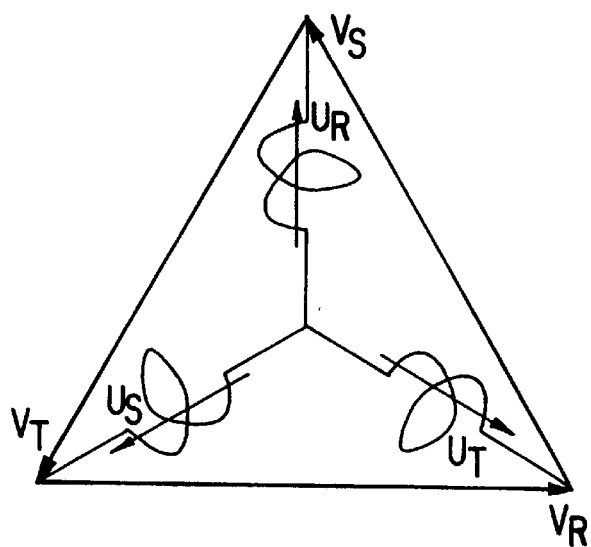
FIG. 7 shows a schematic vector phase diagram for the three phase windings of FIG. 5.

Eliminating the third harmonic is accomplished by combining the outputs of the receiver windings as shown in FIG. 7, where the three windings are connected in a star configuration and the signals used for determining position are taken between the corners of the star. This can also be accomplished by measuring each of the output signals independently from the receiver windings 324, 326 and 327, and then combining them computationally in a corresponding way in a digital signal processing circuit. The following equations outline how the third harmonic component is eliminated by suitably combining the original three phase signals, designated as $U_R$, $U_S$, and $U_T$.

Assume each of the unprocessed phase signals contains the fundamental sinusoidal signal plus the third harmonic signal, with equal amplitude in the three phases, then:

$$U_R = A_0 \sin\left(2\pi \frac{x}{\lambda}\right) + A_3 \sin\left(2\pi \frac{3x}{\lambda}\right)$$

$$U_S = A_0 \cdot \sin\left(2\pi x + \frac{\lambda}{3}\right) + A_3 \sin\left(2\pi 3 \frac{\left(x + \frac{\lambda}{3}\right)}{\lambda}\right)$$

$$= A_0 \cdot \sin\left(2\pi \frac{x}{\lambda} + \frac{2\pi}{3}\right) + A_3 \sin\left(2\pi \frac{3x}{\lambda} + 2\pi\right)$$

$$= A_0 \cdot \sin\left(2\pi \frac{x}{\lambda} + \frac{2\pi}{3}\right) + A_3 \sin\left(2\pi \frac{3x}{\lambda}\right);$$

$$U_T = A_0 \cdot \sin\left(2\pi x - \frac{\lambda}{3}\right) + A_3 \sin\left(2\pi 3 \frac{\left(x - \frac{\lambda}{3}\right)}{\lambda}\right)$$

$$= A_0 \cdot \sin\left(2\pi \frac{x}{\lambda} - \frac{2\pi}{3}\right) + A_3 \sin\left(2\pi \frac{3x}{\lambda} - 2\pi\right)$$

$$= A_0 \cdot \sin\left(2\pi \frac{x}{\lambda} - \frac{2\pi}{3}\right) + A_3 \sin\left(2\pi \frac{3x}{\lambda}\right)$$

Creating new signals by pair-wise subtracting the above-outlined signals from each other eliminates the third harmonic to provide:

$$V_R = U_T - U_S = A_0\left(\sin\left(2\pi \frac{x}{\lambda} - \frac{2\pi}{s}\right) - \sin\left(2\pi \frac{x}{\lambda} + \frac{2\pi}{3}\right)\right) = -A_0\sqrt{3}\cos 2\pi \frac{x}{\lambda}$$

$$V_S = U_R - U_T = A_0\left(\sin\left(2\pi \frac{x}{\lambda}\right) - \sin\left(2\pi \frac{x}{\lambda} - \frac{2\pi}{3}\right)\right) = A_0\sqrt{3}\cos\left(2\pi \frac{x}{\lambda} - \frac{2\pi}{6}\right)$$

$$V_T = U_S - U_R = A_0\left(\sin\left(2\pi \frac{x}{\lambda} + \frac{2\pi}{3}\right) - \sin\left(2\pi \frac{x}{\lambda}\right)\right) = A_0\sqrt{3}\cos\left(2\pi \frac{x}{\lambda} + \frac{2\pi}{6}\right)$$

To get quadrature signals for position calculation in the sane way, $V_S$ and $V_T$ are combined:

$$V_Q = V_S - V_T = A_0\sqrt{3}\left(\cos\left(2\pi\frac{x}{\lambda} - \frac{2\pi}{6}\right) - \cos\left(2\pi\frac{x}{\lambda} + \frac{2\pi}{6}\right)\right)$$

$$= A_0\sqrt{3} * 2\sin 2\pi\frac{x}{\lambda}\sin\left(-\frac{2\pi}{6}\right) = A_0 3\sin 2\pi\frac{x}{\lambda}$$

After identifying the applicable quarter-wavelength position quadrant within the incremental wavelength, the interpolated position within the quarter wavelength is then calculated by:

$$\frac{V_Q}{-V_R} = \sqrt{3} * \tan\left(2\pi\frac{x}{\lambda}\right)$$

Solving for $x$:

$$x = \frac{\lambda}{2\pi} * \tan^{-1}\left(\frac{V_Q}{-V_R * \sqrt{3}}\right)$$

The position calculated this way using the output from three phase receiver windings will not contain any error from third harmonic components in the receiver output signal functions, to the extent that the outputs from all 3 receiver windings have the same third harmonic characteristics, which is generally the case for practical devices. Also, if the receiver signals are amplified in preamplifiers in the electronic unit, the measurement error caused by certain distortion errors in those electronic preamplifiers will be canceled by the above described signal processing in the three phase configuration.

FIGS. 8A–8D show a third preferred embodiment of the read-head and scale for the reduced offset induced current position transducer of this invention. This embodiment contains only one transmitter winding loop, which is placed on one side of the receiver windings on the read-head 420. The scale 410 is a two layer printed circuit board (PCB). Pattern forming coupling loops 412 and 416 are arrayed on the scale 410 along the measurement axis.

Each coupling loop 412 includes a first loop portion 413 which is connected by connection lines 415 to a second loop portion 414. The first and second loop portions 413 and 414 are connected so that an induced current produces the same polarity field in the first loop portion 413 and the second loop portion 414. Each coupling loop 416 includes a first loop portion 417 which is connected by connection lines 419 to a second loop portion 418. The first and second loop portions 417 and 418 are connected so that an induced current produces fields having opposite polarities in the first and second loop portions 417 and 413.

Figure 8A:
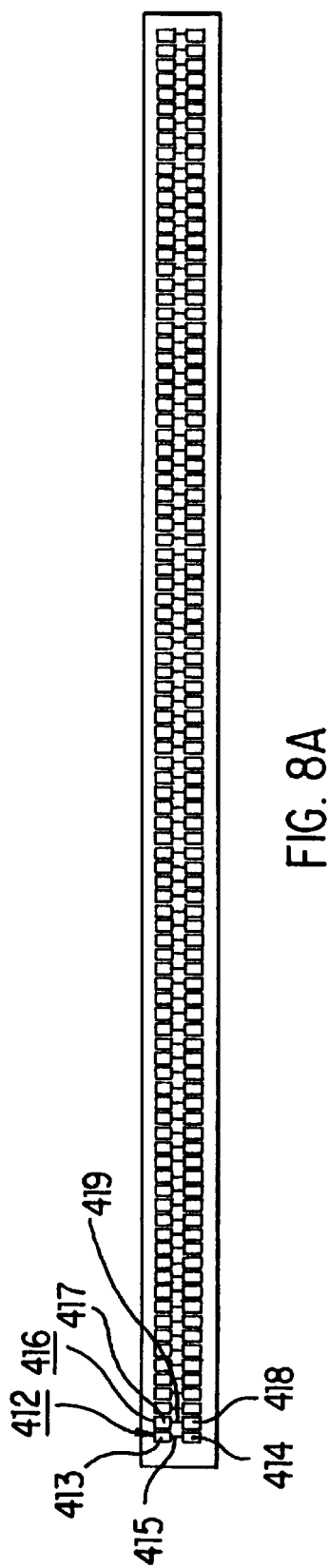
FIG. 8A shows a third preferred embodiment of the scale for the reduced offset induced current position transducer of this invention.
Figure 8B:
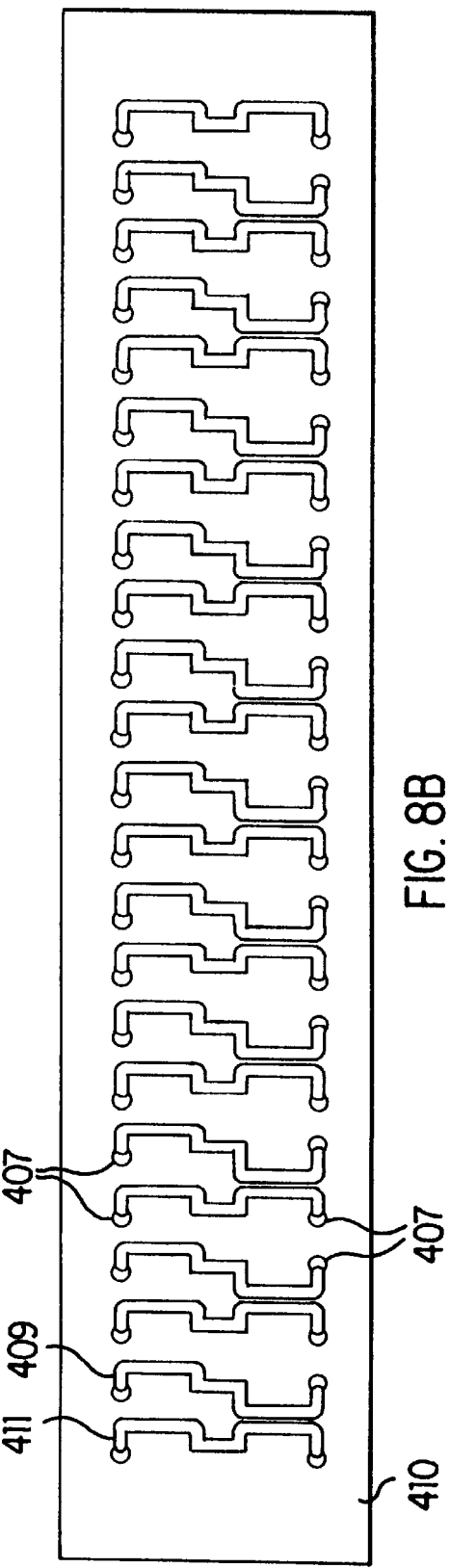
FIG. 8B shows a first portion of the scale of FIG. 8A in greater detail.
Figure 8C:
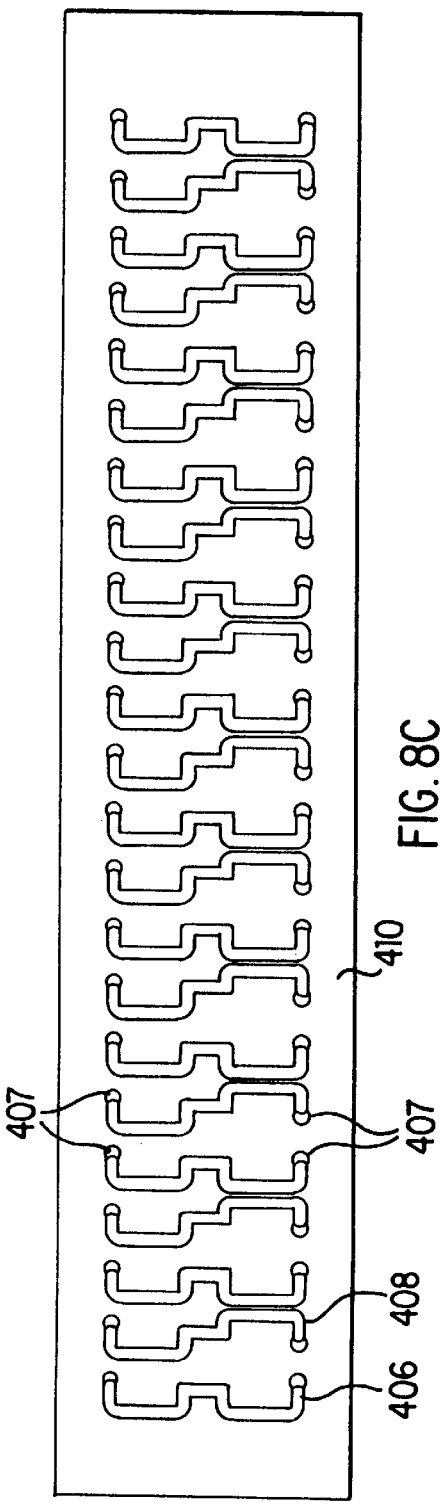
FIG. 8C shows a second portion of the scale of FIG. 8A in greater detail.

The detailed construction of the coupling loops 412 and 416 is shown in FIGS. 8B and 8C. FIG. 8B shows a first conductor pattern provided on a first one of the layers of the PCB forming the scale 410. FIG. 8C shows a second construction pattern provided on a second one of the layers of the PCB forming the scale 410. The individual portions of the first and second patterns formed on the first and second layers are connected via the feed-throughs 407 of the PCB to form the coupling loops 412 and 416.

The read-head 420 is formed by a second PCB and includes a transmitter loop 423 and first and second receiver windings 424 and 426. The first and second receiver windings 424 and 426 are in this embodiment in a two-phase configuration. This embodiment could also use the three-phase configuration previously disclosed. The transmitter loop 423 encloses an area that covers the first loop portions 413 and 417 over the length of the read-head. The transmitter loop 423 is excited in the same way as described previously in conjunction with FIG. 4.

Figure 8D:
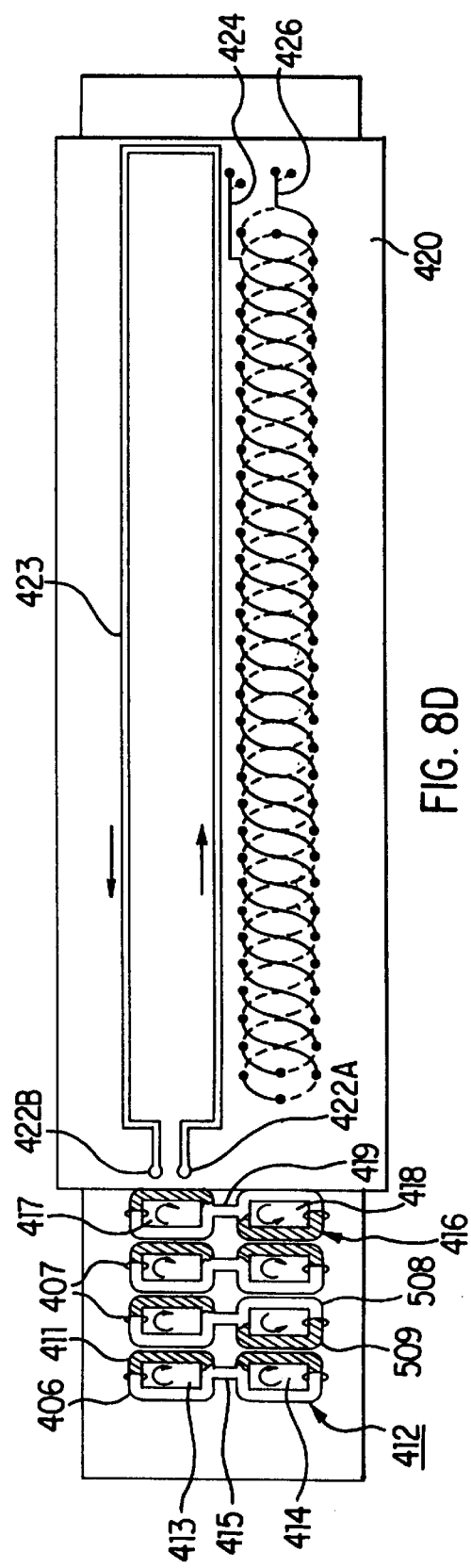
FIG. 8D shows a transducer according to the third preferred embodiment of the reduced offset inductive position transducer.

The first loop portions 413 and 417 of the coupling loops 412 and 416 under the transmitter loop 423 respond to the primary magnetic field generated by the transmitter 423 with an induced EMF that causes a current and magnetic field that counteracts the primary magnetic field produced in the transmitter winding 423. When the transmitter winding current flows counter-clockwise as shown in FIG. 8D, the induced current in the first loop portions 413 and 417 of the coupling loops 412 and 416 flows counterclockwise. The current in the second loop portions 414 of the coupling loops 412 also flows clockwise. However, the current in the second loop portions 418 of the coupling loops 416 flow counterclockwise because of the crossed connections 419 described above.

Therefore, the array of second loop portions 414 and 418 produces a secondary magnetic field with regions of opposite polarity periodically repeating along the scale under the receiver windings 424 and 426 of the read-head unit 420. The secondary magnetic field has a wavelength $\lambda$ equal to the period length for successive ones of the second loop portions 414, which is also equal to the period length for successive ones of the second loop portions 413. The receiver loops of the first and second windings 424 and 426 are designed to have the same wavelength $\lambda$ as the scale pattern.

Hence, the receiver loops of the first and second receiver windings 424 and 426 will exhibit an induced EMF which produces a signal voltage whose amplitude will follow a periodic function with wavelength $\lambda$ when the read-head 420 is moved along the scale 410. Thus, except for the distinction of the single transmitter loop, this embodiment functions in the manner previously described for the embodiment shown in FIGS. 3 and 4.

Figure 9A:
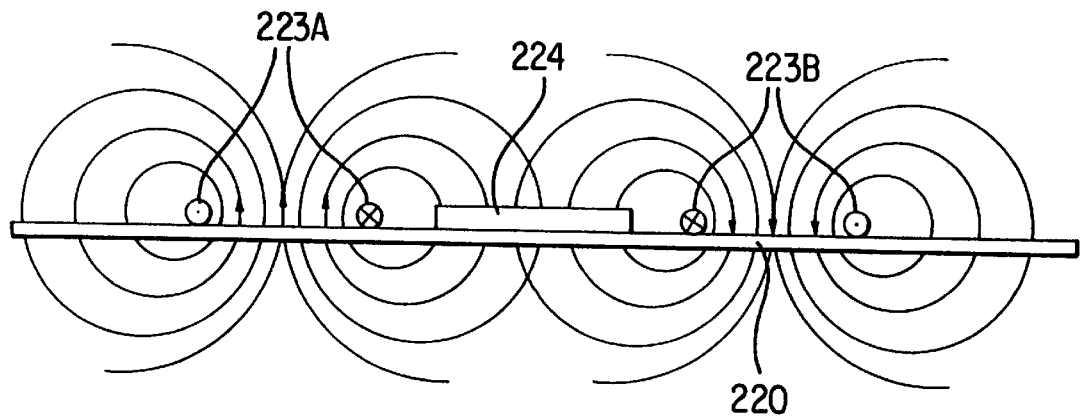
FIG. 9A shows a cross-sectional view of the first preferred embodiment of the reduced offset induced current position transducer of this invention.

FIG. 9A shows a cross-section of an inductive read-head according to the first preferred embodiment of this invention shown in FIG. 4. FIG. 9A illustrates how the primary magnetic field caused by the current in the transmitter loop 223A encircles the conductors and partly crosses through the receiver loops 224 and 226. FIG. 9 also shows how the primary magnetic field caused by the current in the transmitter loop 223B passes through the receiver loops 224 and 226 in the opposite direction from the primary magnetic field caused by the transmitter loop 223A.

Thus, the resulting net magnetic field through the first and second receiver windings 224 and 226 will be very close to zero and the extraneous direct coupling from the transmitter loops 223A and 223B to the first and second receiver windings will be nullified. Experience and theoretical calculations show an improvement in the ratio of useful to extraneous signal components by a factor of more than 100 relative to the embodiment shown in FIG. 1.

Figure 9B:
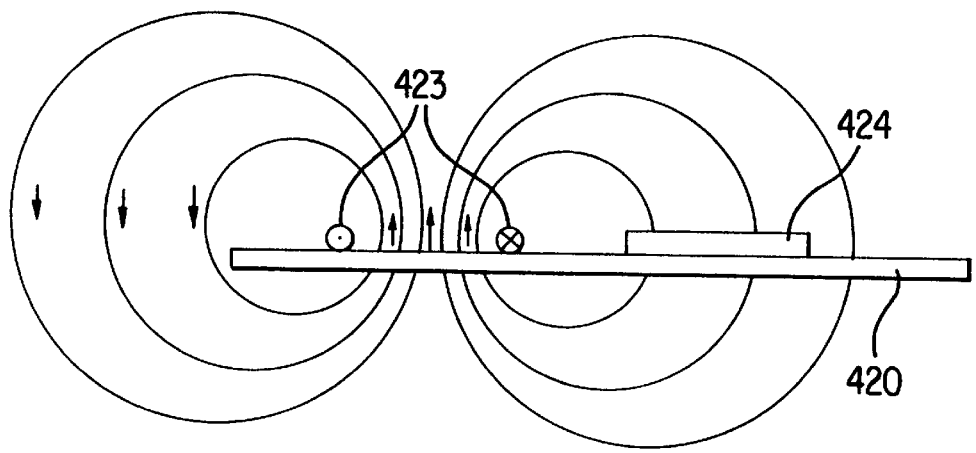
FIG. 9B shows a cross-sectional view of the second preferred embodiment of the reduced offset induced current position transducer of this invention.

FIG. 9B shows a cross-section of an inductive read-head according to the third preferred embodiment of this invention shown in FIG. 8D. FIG. 9B illustrates how the primary magnetic field caused by the current in the transmitter loop 423 encircles the conductors and partly crosses through the first and second receiver loops 424 and 426. Although this case fails to nullify the extraneous direct coupling, as provided in the first preferred embodiment, it still reduces the extraneous direct coupling by virtue of the separation of the transmitter loop 423 and the first and second receiver windings 424 and 426.

Furthermore, the secondary magnetic field having alternating polarities is provided in the vicinity of the first and second receiver windings 424 and 426. This eliminates other sources of offset. According to experience and theoretical calculations, the third embodiment shows an improvement in the ratio of useful to extraneous signal components by a factor of about 10 relative to the embodiment shown in FIG. 1.

It should be appreciated that the previous embodiments may be modified in certain aspects, while retaining many of their inventive benefits. For example, the coupling loops 416 (or 412) of FIG. 8A may be eliminated, while other aspects of this configuration remain the same. In this case, the secondary magnetic field provided in the vicinity of the first and second receiver windings 424 and 426 does not have a pattern of alternating polarities, as in the third embodiment. However, this design still reduces the extraneous direct coupling between transmitter and receiver windings by virtue of the separation of the transmitter loop 423 and the first and second receiver windings 424 and 426.

Furthermore, the use of multiple coupling loops provides the benefit of averaging out the error contributions of small, but significant, random deviations in segments of the winding configurations due to imperfect fabrication processes. Also, even if the coupling loops 416 (or 412) are eliminated, the fundamental operation of the transducer is still based on a moving structured field, defined by the coupling loops 412 (or 416) providing the primary excitation for the first and second receiver windings 424 and 426.

In contrast, in the embodiment shown in FIG. 1, a static uniform field provides the primary excitation for the first and second receiver windings 124 and 126. The receiver winding output signals are based on how this uniform field is affected by moving elements which disturb the uniform excitation field in the vicinity of the first and second receiver windings 124 and 126. The moving structured field excitation approach of this invention provides an inherently superior signal, even if the coupling loops 416 (or 412) are eliminated.

Figure 10:
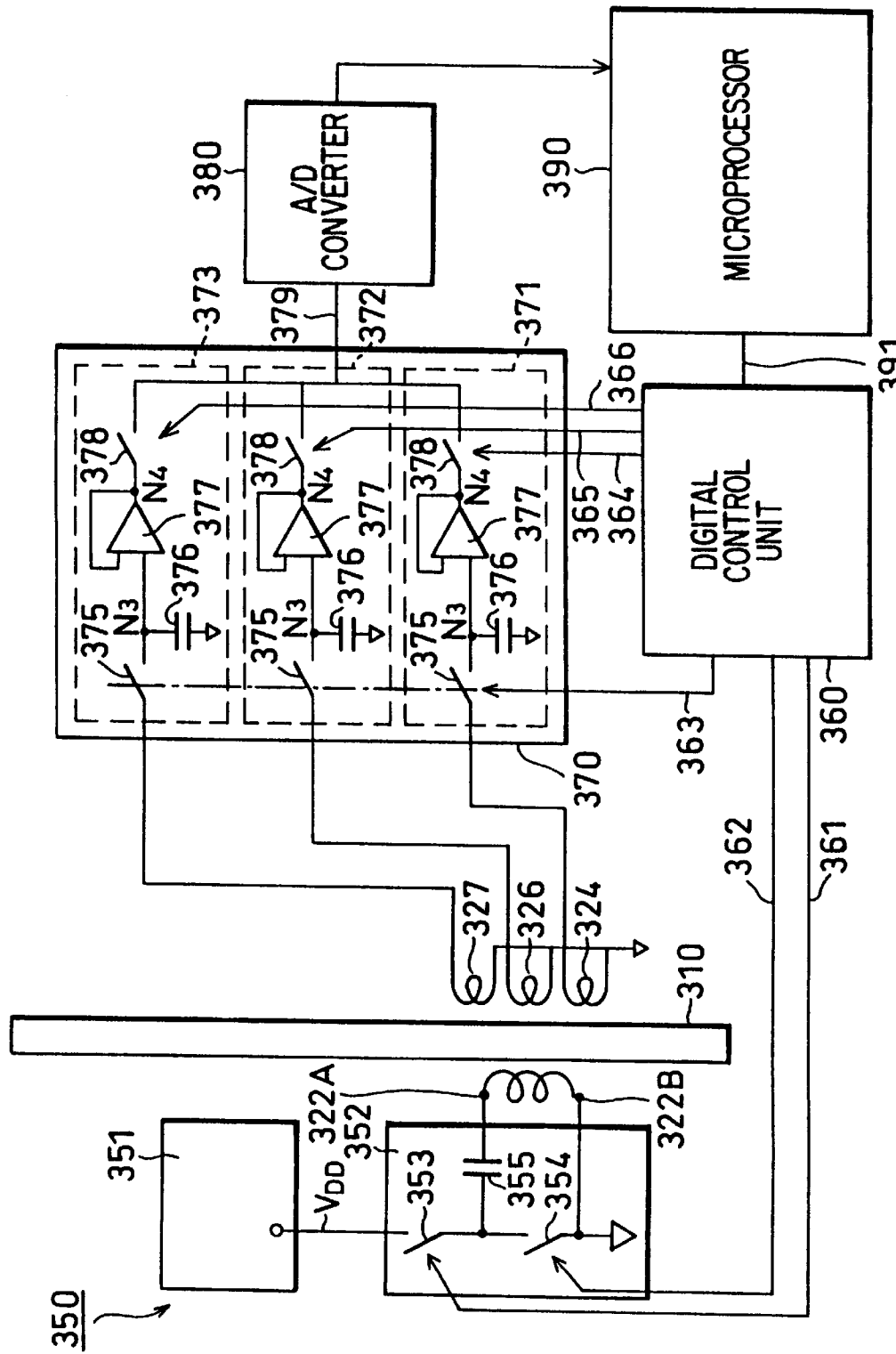
FIG. 10 is a block diagram of the read head shown in FIG. 5 and its associated signal processing circuits.

FIG. 10 shows a block diagram of the second preferred embodiment of the reduced offset induced current position transducer 300 using the three phase read head 320 shown in FIG. 5. Only the essential portions of the signal processing circuit needed to determine the position of the read head 320 relative to the scale 310 are shown in FIG. 10.

As shown in FIG. 10, the transmitter winding 322 is connected to a signal generator circuit 352 of the transmitter drive signal generator 350. The signal generator circuit 352 includes a first switch 353 serially connected to a second switch 354 between ground and a power supply voltage $V_{DD}$ from an energy source 351. One terminal of a capacitor 355 is connected to a node $N_1$ between the first and second switches 353 and 354. A second plate of the capacitor 355 is connected to the terminal 322A of the transmitter winding 322. The second terminal 322B of the transmitter winding 322 is connected to ground. Thus, the transmitter winding 322 forms the inductor in a LC resonant circuit with the capacitor 355.

The transmitter winding 322 is indirectly inductively coupled via the coupling loops 312 and 316 formed on the scale 310 to the first-third receiver windings 324, 326 and 327. The receiver windings 324, 326 and 327 are connected to a sample and hold circuit 370. In particular, the output of the first receiver 324 is connected to a first sample and hold subcircuit 371. The output of the second receiver 326 is connected to a second sample and hold subcircuit 372, while the output of the third receiver 327 is connected to a third sample and hold subcircuit 373.

Each of the three sample and hold subcircuits 371–373 includes a switch 375 receiving an output from the corresponding receiver loop 324, 326, or 327. The output of the switch 375 is connected to the positive input terminal of a buffer amplifier 377. One plate of a sample and hold capacitor 376 is connected to a node $N_3$ between the switch 375 and the buffer amplifier 377. The other plate of the sample and hold capacitor 376 is connected to ground. An output of the buffer amplifier 376 is connected to a switch 378. The negative input terminal of the buffer amplifier 377 is connected to the output of the buffer amplifier at a node $N_4$.

The outputs of the switches 378 of the three sample and hold subcircuits 371–373 are connected to a single output line 379 that is connected to an input of analog-to-digital (A/D) converter 380. The A/D converter 380 converts the output of the sample and hold circuit 370 from an analog value to a digital value. The digital value is output to a microprocessor 390 which processes the digital values from the A/D converter to determine the relative position between the read head 320 and the scale 310.

Each position within a wavelength can be uniquely identified by the microprocessor, according to known techniques and the equations previously disclosed herein. The microprocessor 390 also uses known techniques to keep track of the direction of motion and the number of wavelengths that are traversed to determine the total position for the transducer relative to an initial reference position.

The microprocessor 390 also controls the sequence of signal sampling by outputting a control signal over a signal line 391 to a digital control unit 360. The digital control unit 360 controls the sequence of transmission, signal sampling and A/D conversion by outputting control signals on the signal lines 361–366 to the transmitter drive signal generator 350 and the sample and hold circuit 370. In particular, as shown in FIG. 10, the digital control unit 360 outputs switch control signals over the signal lines 361 and 362 to the first and second switches 353 and 354, respectively, for controlling the transmitter excitation.

The digital control unit 360 outputs switch control signals on the signal lines 363–366 to the sample and hold circuit 370. In particular, the control signal 363 controllably opens and closes the switches 375 of the first-third sample and hold subcircuits 371–373 to connect the receiver windings to the sample and hold capacitors 376. When the control signal 363 controllably opens the switches 375, the signals received from the receiver windings are stored in the sample and hold capacitors 376. The switch control signals on the signal lines 364–366 are used to controllably connect the outputs of the buffer amplifiers 377 of one of the first-third sample and hold subcircuits 371–373, respectively, to the A/D converter 380 over the signal line 379.

Figure 11:
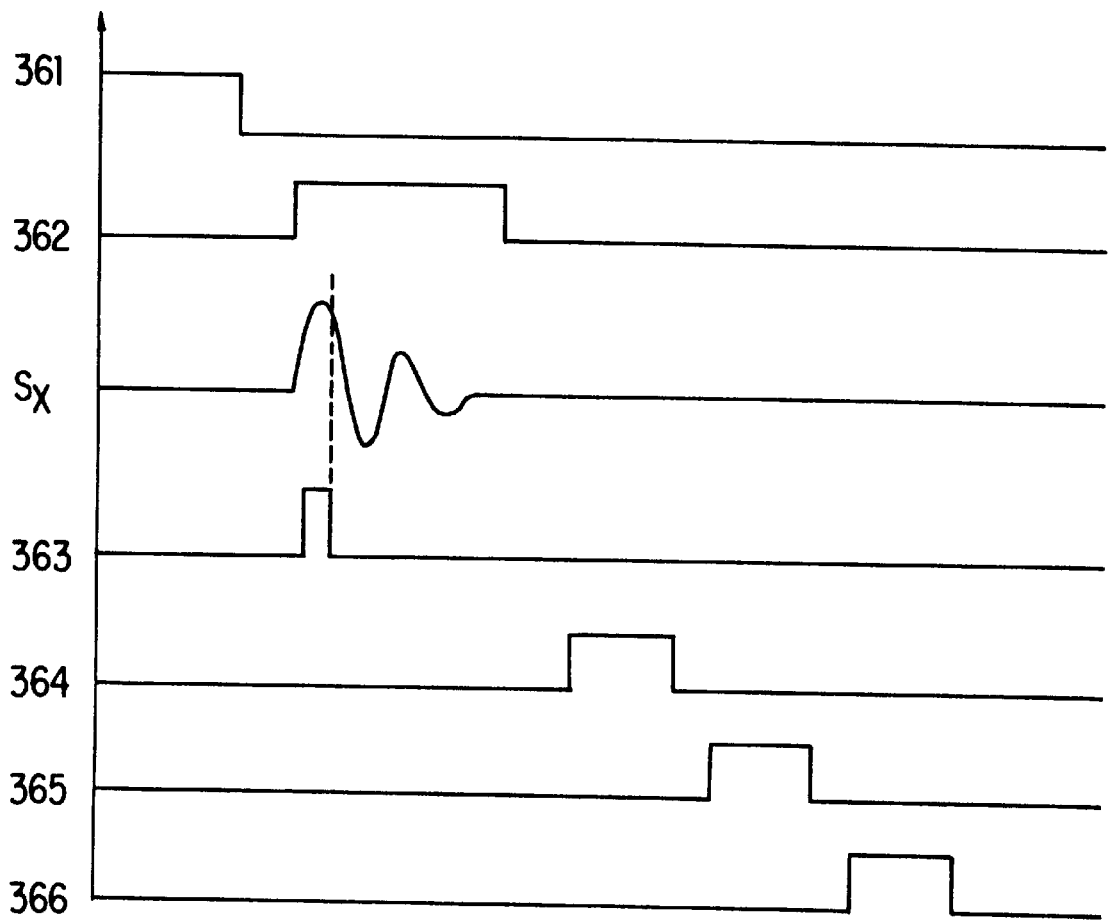
FIG. 11 is a timing diagram for one of the three channels of the electronic unit shown in FIG. 10.

FIG. 11 shows a timing diagram for generating the switch control signals 361–366 to obtain a position measurement. First, the switch control signal output on the signal lines 361 is set to a high state to close the switch 353. This charges up the capacitor 355 to the supply voltage $V_{DD}$. The switch control signal on the signal line 361 is then set to a low state to open the switch 353.

Next, the switch control signal output on the signal lines 362 is changed from a low state to a high state to close the switch 354. This allows the capacitor 355 to discharge through the corresponding transmitter winding 322. In particular, the capacitor 355 forms a resonant circuit with the transmitter windings 322 with a chosen resonant frequency on the order of several MHz. The resonance is a damped oscillation with a waveform corresponding essentially to the signal $S_x$ shown in FIG. 11.

The signal $S_x$ appears with the same time function on each of the receiver windings 324, 326 and 327. However, the amplitude and polarity of the signal $S_x$ appearing on each of the receiver windings 324, 326 and 327 depends on the position of the read head 320 relative to the scale 310, as shown in FIG. 6.

Before the signal $S_x$ on the receiver windings reaches a peak, the switch control signal on the signal line 363 changes from a low state to a high state to begin charging each of the sample and hold capacitors 376 of the sample and hold circuit 370. At a point just after, but approximately at, the peak of the signal $S_x$, the switch control signal on the signal line 363 returns to the low state to open the switches 375. This holds the amplitude of the signals $S_x$ for each of the three receiver windings on the corresponding one of the sample and hold capacitors 376 of the first-third sample and hold subcircuits 371–373. At some point thereafter, the switch control signal on the signal line 362 is returned to the low state to open the switch 354.

Next, at some time after the control signal 363 has returned to the low state, the switch control signal on the signal line 364 changes from the low state to the high state to close the switches 378 of the sample and hold subcircuit 371. This connects the sampled value held on the corresponding sample and hold capacitor 376 over the signal line 379 to the A/D converter 380. The A/D converter 380 converts the analog value on the signal line 379 to a digital value and outputs the digital value to the microprocessor 390. The switch control signal on the signal line 364 returns to the low state to open the corresponding switch 378. This sequence is then repeated for the switch control signals output on the signal lines 365 and 366 to connect the signals sampled by the sample hold subcircuits 372 and 373 to the A/D converter 380 over the signal line 379.

This process is repeated according to the program in the microprocessor. A program can easily be made that adapts the sampling rate of the system to the speed of movement of the transducer, thereby minimizing the current consumption. This operation is well known to those skilled in the art and thus will not be described in further detail herein.

The previously described signal processing system can be operated on very low power with the disclosed inductive position transducers, and other related inductive position transducers, if desired. For example, intermittently activating the drive signal generator 352 to support a signal processing system sampling frequency of about 1 kHz provides sufficient accuracy and motion tracking capability for most applications. To reduce power consumption, the drive signal generator duty cycle can be kept low by making the pulses relatively short. For example, for the 1 kHz sampling frequency described above, a suitable pulse width is about 0.1–1.0 $\mu s$. That is, the duty cycle of the pulses having sampling period of 1 ms is 0.01%–0.1%.

The resonant frequency of the capacitor 355 and the winding 322 is then preferably selected such that the peak of the voltage across the capacitor 355 occurs before the end of the 1.0 $\mu s$ or less pulse. Thus, the resonant frequency is or the order of several megahertz, as previously disclosed. The corresponding magnetic flux will therefore be modulated at a frequency above 1 MHz, and typically of several megahertz. This is considerably higher than the frequencies of conventional inductive position transducers.

The inventors have determined that, at these frequencies, the currents generated in the scale 310 with the coupling loops 312 and 316 produce strong inductive coupling to the first-third receiver windings 324, 326 and 327. The EMFs generated in the first-third receiver windings 324, 326 and 327, and the resulting output signal, therefore respond strongly to variations in coupling loop position. This occurs despite the low duty cycle and low power used by the pulsed drive signal.

The strength of the response, combined with the low duty cycle and low power consumption, allows the inductive position transducer to make measurements while the drive signal generator 350 and the remainder of the signal processing electronic circuit shown in FIG. 10 draw an average current preferably below 200 $\lambda A$, and more preferably below 75 $\mu A$, for low power applications. It should be understood that "average current" as used herein means the total charge consumed over one or more measurement cycles, divided by the duration of the one or more measurement cycles, while the inductive position transducer is in normal use.

The inductive position transducers similar to the type disclosed herein can therefore be operated with an adequate battery lifetime using three or fewer commercially available miniature batteries or with a solar cell. Further details regarding low power signal processing are disclosed in the incorporated references.

It should be appreciated that although the foregoing embodiments are shown as linear transducers, that the designs are readily converted to rotary applications, according to the applicable teachings of incorporated U.S. patent application Ser. No. 08/441,769. Furthermore, although the foregoing embodiments are shown with spatially uniform windings designated as the transmitter windings, and spatially modulated windings designated as the receiver windings, it will be apparent to one skilled in the art that the disclosed transducer winding configurations will retain all of their inventive benefits if the roles of the transmitter and receiver windings are "reversed" in conjunction with appropriate signal processing. One such appropriate signal processing technique is disclosed in reference to FIG. 21 of incorporated U.S. patent application Ser. No. 08/441,769. Other applicable signal processing techniques will be apparent to those skilled in the art.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An inductive position sensor, comprising:
   a first member;
   a second member having a measuring axis, the first member movable along the measuring axis;
   at least one magnetic field generator positioned on one of the first and second members, each magnetic field generator generating a first changing magnetic flux in a first flux region in response to a drive signal;
   a plurality of flux coupling loops positioned on the other of the first and second members, a first portion of each flux coupling loop positionable within the first flux region and an induced current generated in the first portion in response to the first changing magnetic flux, and the induced current producing a second changing magnetic flux in a second portion of the flux coupling loop in a second flux region that is physically separated from the first flux region; and at least one magnetic flux sensor positioned on the one of the first and second members;

wherein:

at least one of a) the at least one magnetic flux sensor, and b) the at least one magnetic field generator includes an inductive area extending along the measuring axis and spatially modulated along the measuring axis so that the width of the inductive area alternating increases and decreases, each magnetic flux sensor is positioned outside the first flux region to sense the second changing magnetic flux in the second flux region portion of at least one flux coupling loop, and each magnetic flux sensor generates an output signal which is a function of the relative position between the magnetic flux sensor and the plurality of flux coupling loops based on the sensed magnetic flux.

2. The inductive position sensor of claim 1, wherein the inductive area comprises a plurality of alternating polarity regions.

3. The inductive position sensor of claim 2, wherein, in the absence of the the plurality of flux coupling loops, the output signal generated by each magnetic flux sensor is insensitive to the changing magnetic flux generated by each magnetic field generator.

4. The inductive position sensor of claim 2, wherein the pattern of alternating polarity regions comprises regions along a surface, the regions bounded by at least one conductor positioned on the surface in a prescribed pattern.

5. The inductive position sensor of claim 1, wherein the one of a) the at least one magnetic field generator and b) the at least one magnetic flux sensor which is formed with the inductive area spatially modulated along the measuring axis is positioned on the first member or the second member, and the the plurality of flux coupling loops is positioned on the other one of the first member and the second member.

6. The inductive position sensor of claim 5, wherein the other of a) the at least one magnetic field generator and b) the at least one magnetic flux sensor is positioned on either the first member or the second member.

7. The inductive position sensor of claim 1, wherein at least one of the first and second members are printed circuit boards, and at least one of the magnetic field generator, the plurality of flux coupling loops, and magnetic flux sensor are fabricated by printed circuit board processing.

8. The inductive position sensor of claim 1, further comprising:

an energy supply source that outputs a power supply;

a drive circuit that inputs the power supply and outputs a drive signal to at least one of the at least one magnetic field generator during each measurement cycle; and an analyzing circuit that inputs the output signal from each at least one magnetic field sensor, determines the position of the first member relative to the second member, and outputs a position signal indicative of the position of the first member relative to the second member at a first level of resolution.

9. The inductive position sensor of claim 8, wherein the drive circuit comprises a capacitor discharged through the at least one of the at least one magnetic field generator.

10. The inductive position sensor of claim 9, wherein the capacitor and the at least one of the at least one magnetic field generator form a resonant circuit.

11. The inductive position sensor of claim 8, wherein the analyzing circuit comprises a counter that counts fractions of cycles of the at least one output signal output from the at least one magnetic field sensor at a second level of resolution coarser than the first level of resolution in response to motion of the first member along the measuring axis.

12. The inductive position sensor of claim 1, wherein:

the at least one magnetic flux sensor includes three magnetic flux sensors, each magnetic flux sensor having a periodic pattern of spatially modulated inductive areas having a same wavelength W, the three magnetic flux sensors offset from each other by a length equal to W/3; and the analyzing circuit includes means for substantially eliminating an influence of signal components that are third harmonics of the wavelength W.

13. The inductive position sensor of claim 1, wherein the changing magnetic flux generated by the at least one magnetic field generator changes at a rate equivalent to an oscillation frequency of at least 1 MHz.

14. The inductive position sensor of claim 1, wherein the width alternatingly increases and decreases in a periodic pattern having a selected wavelength.

15. The inductive position sensor of claim 14, wherein the portion of each coupling loop adjacent the periodic pattern spans, at most, one-half of the wavelength of the periodic pattern along the measuring axis.

16. The inductive position sensor of claim 14, wherein the plurality of coupling loops includes a first plurality of coupling loops of a first type are arranged along the measuring axis at a pitch equal to the wavelength.

17. The inductive position sensor of claim 16, wherein the plurality of coupling loops further includes a second plurality of coupling loops of a second type are arranged along the measuring axis one-half wavelength offset from the first plurality of coupling loops and at a pitch equal to the wavelength, and coupling loops of the first and second type alternate along the measuring axis in at least the region adjacent to the periodic pattern.

18. The inductive position sensor of claim 17, wherein, in one of the first or second coupling loop types, the induced current produces the same polarity flux in the first flux region portion and the second flux region portion, and, in the other of the first or second coupling loop types, the induced current produces flux in the second flux region portion which is opposite in polarity to the flux induced in the first flux region portion.

19. The inductive position sensor of claim 17, wherein the first and second coupling loop types couple to the same magnetic flux generator region, and are configured so that coupling loops of the first type extend in a first direction perpendicular to the measuring axis to couple to a first magnetic flux sensor region and the coupling loops of the second type extend in a direction perpendicular to the measuring axis opposite to the coupling loops of the first type to couple to a second magnetic flux sensor region.

20. The inductive position sensor of claim 17, wherein the first and second coupling loop types couple to the same magnetic flux sensor region, but are configured so that coupling loops of the first type extend in a first direction perpendicular to the measuring axis to couple to a first magnetic flux generator region and the coupling loops of the second type extend in a direction perpendicular to the measuring axis opposite to the coupling loops of the first type to couple to a second magnetic flux generator region.

21. An inductive position sensor, comprising: a first member;

a second member having a measuring axis, the first member movable along the measuring axis;

at least one magnetic field generator positioned on one of the first and second members, each magnetic field generator generating a first changing magnetic flux in a first flux region in response to a drive signal;

a plurality of flux coupling loops positioned on the other of the first and second members, a first portion of each flux coupling loop positionable within the first flux region and an induced current generated in the first portion in response to the first changing magnetic flux, and the induced current producing a second changing magnetic flux in a second portion of the flux coupling loop in a second flux region that is physically separated from the first flux region; and at least one magnetic flux sensor positioned on the one of the first and second members;

wherein:

at least one of a) the at least one magnetic flux sensor, and b) the at least one magnetic field generator includes an inductive area extending along the measuring axis and spatially modulated along the measuring axis so that the width of the inductive area alternatingly increases and decreases, each magnetic flux sensor is positioned outside the first flux region to sense the second changing magnetic flux in the second flux region portion of at least one flux coupling loop, each magnetic flux sensor generates an output signal which is a function of the relative position between the magnetic flux sensor and the plurality of flux coupling loops based on the sensed magnetic flux, and one of a) the at least one magnetic flux generator and b) the at least one magnetic flux sensor includes two similar portions arranged symmetrically on opposite sides of the other one of the at least one magnetic flux generator and the at least one magnetic flux sensor, such that, in absence of the plurality of coupling loops, the net flux through the magnetic flux sensor is substantially zero.

22. The inductive position sensor of claim 1, wherein the measuring axis is linear.

23. The inductive position sensor of claim 1, wherein the measuring axis is circular.

24. The inductive position sensor of claim 1, wherein each of a plurality of the spatially modulated inductive areas extending along the measuring axis comprises an area outlined by a patterned conductor insulated from other patterned conductors, and a plurality of such inductive areas at least partially overlap.

25. The inductive position sensor of claim 24, wherein N of the plurality of the spatially modulated inductive areas are identical to each other and are periodically modulated along the measuring axis at a selected wavelength W, and the N inductive areas are offset from each other by a length O along the measuring axis, where O=W/2N for N equal to 2, and O=W/N for N greater than 2.

26. The inductive position sensor of claim 1, wherein the plurality of flux coupling loops is arranged along the measuring axis and the measuring range of the sensor is determined by the extent of the plurality of coupling loops.

27. An inductive position sensor comprising:

a first member;

a second member having a measuring axis, the first member movable along the measuring axis;

a low power energy supply source providing a power supply to a drive circuit that inputs the power supply and outputs an intermittent drive signal;

at least one magnetic field generator positioned on one of the first and second members, each magnetic field generator inputting the drive signal and generating a first changing magnetic flux in a first flux region in response to the intermittent drive signal;

a plurality of flux coupling loops positioned on the other of the first and second members, a first portion of each flux coupling loop positionable within the first flux region, an induced current generated in each flux coupling loop in response to the first changing magnetic flux, and the induced current of each flux coupling loop producing a second changing magnetic flux in a second flux region portion of that flux coupling loop outside the first flux region;

at least one magnetic flux sensor positioned on the one of the first and second members, each magnetic flux sensor positioned outside the first flux region to sense the second changing magnetic flux in the second flux region portion of the at least one flux coupling loop, and generating an output signal that is a function of the relative position between that magnetic flux sensor and the plurality of flux coupling loops based on the sensed magnetic flux; and an analyzing circuit that inputs the output signal from at least one magnetic flux sensor and outputs an output signal indicative of the position of the first member relative to the second member at a first level of resolution.

28. The inductive position sensor of claim 27, wherein the drive circuit comprises a capacitor discharged through the magnetic field generator.

29. The inductive position sensor of claim 28, wherein the capacitor and the magnetic field generator operate as a resonant circuit.

30. The inductive position sensor of claim 27, wherein the first changing magnetic flux changes at a rate equivalent to an oscillation frequency of at least 1 MHz in response to the intermittent drive signal.

31. The inductive position sensor of claim 27, wherein:

at least one of a) the at least one magnetic flux sensor, and b) the at least one magnetic field generator includes an inductive area extending along the measuring axis, and the inductive area is spatially modulated along the measuring axis so that the width of the inductive area alternatingly increases and decreases;

the output signal from each magnetic flux sensor exhibits spatial cycles which are a function of the relative position between that magnetic flux sensor and the plurality of flux coupling loops; and the analyzing circuit comprises a counter that counts fractions of cycles of the output signal from the at least one magnetic flux sensor in response to motion of the first member along the second member at a second level of resolution that is coarser than the first level of resolution, the counter providing an approximate position of the first member relative to the second member.

32. The inductive position sensor of claim 31, wherein the counter is responsive at spatial intervals of at most ¼ cycle.

33. The inductive position sensor of claim 31, wherein the inductive area comprises a plurality of alternating polarity regions.

34. The inductive position sensor of claim 33, wherein the plurality of alternating polarity regions comprises regions of a surface bounded by at least one conductor positioned on the surface in a prescribed pattern.

35. The inductive position sensor of claim 27, wherein the intermittent drive signal comprises at least one pulse signal.

36. The inductive position sensor of claim 35, wherein the analyzing circuit determines changes in the relative position at a coarse level of resolution during each pulse interval and determines the relative position at a finer level of resolution once during a plurality of pulse intervals.

37. The inductive position sensor of claim 35, wherein the analyzing circuit includes synchronous sampling means for sampling the output signal from at least one magnetic flux sensor synchronously with the pulse signal.

38. The inductive position sensor of claim 37, wherein the synchronous sampling uses sample timing based on an expected time delay between the pulsed signal and a peak in a response of a resonant circuit formed by the pulse generator components and the magnetic field generator components.

39. The inductive position sensor of claim 27, wherein the inductive position sensor draws at most an average current of 200 $\mu$A from the low power energy supply.

40. The inductive position sensor of claim 27, wherein the combination of the drive circuit and the magnetic flux generator draws at most an average current of 75 $\mu$A from the low power energy supply.

* * * * *